Fig. 2.

Oct. 30, 1951 — E. B. FITCH — 2,572,848
METHOD AND APPARATUS FOR CONTINUOUSLY
CONDUCTING ION EXCHANGE OPERATIONS
Filed Jan. 5, 1950 — 3 Sheets-Sheet 3

Fig. 3.

INVENTOR
Elliott B. Fitch
BY
Arthur Middleton
ATTORNEY

Patented Oct. 30, 1951

2,572,848

UNITED STATES PATENT OFFICE 2,572,848

METHOD AND APPARATUS FOR CONTINUOUSLY CONDUCTING ION EXCHANGE OPERATIONS

Elliott B. Fitch, Westport, Conn., assignor to The Dorr Company, Stamford, Conn., a corporation of Delaware Application January 5, 1950, Serial No. 136,976

6 Claims. (Cl. 210—24)

This invention relates to the treatment of raw water for the purpose of conditioning it for certain industrial uses where it is desired to have the water not only softened, but also to have its alkalinity as well as its total content of dissolved ionized solids diminished to a predetermined degree according to specifications. For example, water to be used in beverage manufacture is required to have thus been conditioned.

Water of such qualifications is known to be obtainable by so-called split-treatment ion exchange whereby one portion of the water is merely softened while another portion has its alkalinity as well as its total dissolved solids content reduced whereupon both portions are blended to a mixture that answers the particular industrial requirements. Such treatment as heretofore known produces the so-called blended water by way of the cyclic and intermittent operation of stationary ion exchange beds, whereby each bed is subjected alternatingly to exhaustion and regeneration, so the treated water is obtained intermittently.

In the known treatment by ion exchange for producing blended water a portion of the raw water is passed through a bed of zeolite, that is an inorganic cation exchange material, whereby hardness-imparting ions (Ca, Mg) are removed from the water in exchange for Na-ions. Another portion of the raw water is passed through a bed of acid-regenerated cation exchange material which removes hardness-imparting cations as well as other cations in exchange for H-ions with the result that this portion of the water is rendered acid in proportion to the extent of that exchange. Both portions of the raw water thus treated are blended in such a manner that there is produced a softened water in which the alkalinity as well as the total content of dissolved solids has been lowered to a degree specified.

Conventionally, the one phase of the split treatment, namely the softening phase, requires a bed of granular zeolite which is inorganic and which is said to operate in the so-called Na-ion cycle. That cycle comprises exhaustion and regeneration of the material. Exhaustion takes place when the exchange capacity of the zeolite is allowed to selectively adsorb from the water hardness-imparting cations while releasing into the water Na-ions in an amount equivalent to the adsorbed cations, thus producing a softened water in which such hardeners as Ca and/or Mg have been replaced with Na, even though without any reduction in dissolved solids. Regeneration is effected by contacting the exhausted zeolite with a neutral salt such as NaCl whereby it becomes resaturated with Na-ions restoring its exchange and softening capacity.

The other phase of the conventional split treatment, namely the acidification and reduction in dissolved solids content, requires a bed of granular cation exchange material of the kind that operates in the so-called H-ion exchange cycle and is therefore herein also termed an H-ion exchange material. Such a material may be of the class of so-called exchange resins also called "organolites" because of their organic nature as distinct from the zeolites which are inorganic. The operating cycle comprises exhaustion and regeneration of the material by the respective ion exchange reactions. Exhaustion of the exchange capacity of the material takes place while the material is allowed to adsorb cations from the water indiscriminately including the hardeners Ca and Mg, while releasing H-ions into the water. This exchange renders the water acid to the extent of that exchange and incident to what is in effect a reduction in the amount of dissolved solids originally present. Having been thus exhausted the exchange capacity of the material is restored by contact with a suitable acid such as $H_2SO_4$ or HCl whereby the material becomes resaturated with H-ions.

Whenever in the treatment of the respective water portions, a stationary ion exchange bed that is being operated in its cycle such as above set forth, approaches or reaches the limit of its exchange by exhaustion, this weakening or so-called "breakthrough" of the bed is accompanied and signalled by a rise in the pH of the treated water passing from the bed, and such fluctuations must be taken care of and be equalized by a corresponding blending of the respective treated water portions to the end of producing a blended water to meet specifications.

It is among the objects of this invention to devise a method and means for rendering split treatment ion exchange as it was heretofore understood, non-intermittent as well as more economical, so that a supply of treated water having the qualifications of what was above termed blended water is obtained non-intermittently and with uniform characteristics, as well as economically, namely at a minimum expense for regenerant chemicals and at a minimum of other operating costs.

More specifically, it is among the objects to provide a method, a treatment system, and also apparatus-equipment whereby treated water that meets blended-water specifications yields directly from the system non-intermittently without the need of employing a special blending step as heretofore understood; whereby the characteristics of the water treated are nevertheless readily controllable while the pH fluctuations above referred to are eliminated; whereby on a comparative basis there are attained various important economies and savings in production and operating costs, namely savings in regenerant chemicals, saving in time required for the production of a given quantity of water per unit volume of exchange material, and saving in labor; and whereby the all-around conduct and control of the operation is greatly simplified. The water treatment system according to this invention will herein briefly be termed a continuous blending system.

In order to attain these objects this invention proposes to utilize a single kind of exchange material suited for operating in both the Na-ion and the H-ion exchange cycle, and for that purpose to regenerate the material partly with salt (Na-ions) and partly with acid (H-ions) so that there results a mixedly regenerated material that holds available for exchange Na-ions as well as H-ions in a predetermined proportion controlled to meet blended-water specifications. The material having thus been regenerated for a dual purpose is fed continuously to a water treatment zone to which raw water also is continuously being fed, while treated water (having blended-water characteristics) as well as exhausted exchange material are continuously withdrawn from the system at a corresponding rate. That is to say, as the water and the exchange material contact each other while in transit through this zone the respective exchange reactions of the two kinds of ion exchange cycles occur simultaneously and continuously, as well as in the predetermined proportion of a Na-ion to H-ion exchange. Withdrawn exchange material exhausted by and saturated with cations from the water, is then continuously re-transferred to the regeneration zone in order to have its mixed exchange capacity restored for renewed use in the water-treatment zone.

In order to effect its regeneration and re-conditioning the exhausted material is allowed to pass gravitationally first through a regeneration zone and then through a washing zone in countercurrent to upflowing streams of regenerant solutions and of washwater. That is to say in descending through the regeneration zone the material has its mixed exchange capacity restored by upflowing streams of the respective regenerant solutions, namely salt and acid which when spent leave the system together with spent wash water, and in further descending through the washing zone the material is washed free of residual regenerant chemical by an upflowing stream of wash water which eventually joins and is utilized in the codirected streams of regenerant solutions. The mixedly regenerated and washed material is then re-transferred and continuously fed to the water treatment zone where it again becomes exhausted by contact with raw water and thereby completes a cycle of its repetitive cyclic path through the treatment system.

For its embodiment this invention avails itself of certain features found in a system for non-intermittently producing softened water described in the copending patent application Serial No. 98,448, filed June 11, 1949, now Patent No. 2,528,099, Oct. 31, 1950. The copending application describes a system in which the exchange material is a zeolite operating in the Na-ion cycle to effect softening only. The zeolite is moved repetitively through a cyclic system which comprises a regeneration zone, a washing zone and a water softening zone, whereby a continuous supply of softened water is derived from the system. By way of reference this will herein be termed the continuous softening system as distinct from the continuous blending system of the present invention.

One of the criteria of the continuous softening system described in the copending application lies in the provision of a regeneration tower which is divided into an upper and a lower treatment zone by means of a two-way permeable horizontal partition. The partition as well as the bottom of the tower each support a body of subsided although downwardly migrating granular cation exchange material—so-called zeolite. This material when exhausted by water softening is supplied to the top of the tower at a rate so controlled as to feed to the upper treatment zone substantially at the rate at which regenerated and washed material is withdrawn from the bottom end of the tower. The material descending through the tower passes through the partition by way of one or more openings having downwardly extending spouts herein called down-spouts of a suitable length and of suitable cross-sectional area, determined by considerations set forth below. Wash-water is supplied to the tower at the bottom of the tank to rise countercurrently to the gravitational movement of the exchange material, thus rising first through the lower zone which is the washing zone and then by way of perforations in the partition into and through the upper zone which is the regeneration zone as will presently be seen. Underneath the partition there is a space or intermediate zone the depth of which is defined by the length of the down-spouts. In the operation of the tower this intermediate zone is merely liquid filled and free of any bulk of the exchange material, and into this zone rises liquid from the lower body of exchange material before passing on upwardly through the partition into the upper body of exchange material. This intermediate zone is termed the mixing zone because into it significantly is introduced a continuous supply of regenerant salt solution, namely NaCl of relatively high concentration to mix with and dilute spent wash-water rising from the washing zone. In fact the spent wash-water represents a weak solution of regenerant chemical since it contains recovered unspent salt previously carried part-way into the washing zone with and by the regenerant exchange material descending through the down-spouts of the partition. This weak solution meets and mixes with the strong salt solution in the mixing zone.

The mixture of the strong and the weak solution then rising through the partition represents a regenerant solution of intermediate strength suited for regenerating the material descending in the upper zone. Spent regenerant solution rises from the regeneration zone to discharge from the top end portion of the tower. This tower containing the regeneration zone proper in its upper portion and the washing zone in its lower portion is also briefly termed the regeneration tower.

Another criterion of the continuous softening system described in the copending application lies in the manner of the implementation of the water-softening zone. That implementation comprises a tank termed the softening tank having a false perforated bottom in the nature of a so-called constriction plate to the underside of which is fed the raw water to be softened, while into the space above the constriction plate is fed a continuous supply of freshly regenerated exchange material suspended in a suitable amount of carrier water, as derived from the bottom end of the tower. The upflowing water keeps the exchange material in a teeter condition during softening as distinct from the condition of subsidence of the material in the regeneration tower, and the water is softened while thus in contact with the material. Softened water discharges from the top of the tank by overflow while exchange material of an average degree of exhaustion is being continuously withdrawn from the lower portion of the tank although from a zone above the constriction plate.

Other criteria of implementation of the continuous softening system described in the copending application lie in instrumentalities and control for maintaining the cyclic transit of the exchange material, namely, means employed for transferring regenerated material from the bottom of the tower to the softening tanks, as well as in instrumentalities employed for transferring exhausted material from the softening tank to the top of the tower.

The present invention in providing a continuous blending system avails itself of teachings found in the above criteria of the continuous softening system. That is to say, externally viewed the continuous blending system of the invention employs a system that comprises a regeneration tower operating in circuit with a water treatment tank by way of certain transfer means and control means for maintaining the circulation of the exchange material through the system, which are similar to those employed in the aforementioned continuous softening system. However, in its operation the continuous blending system of this invention differs from the aforementioned softening system in that the regeneration tower yields an exchange material that is mixedly regenerated, namely in part regenerated to its Na-ion form and in part to its H-ion form in a required proportion, and further differs in that the water being treated with mixedly regenerated material is being softened concomitantly with having its alkalinity and its dissolved solids content reduced. If the proper controls are employed a uniform-blended treated water thereby yields continuously from this system. Since the exchange material employed is capable of operating in the Na-ion cycle as well as in the H-ion cycle, two kinds of solutions, namely acid and salt brine are being fed in continuous supplies to the tower according to this invention.

The object of regeneration economy is attained in the operation of the regeneration tower according to this invention by introducing the acid into the tower at a point below that at which the brine is being introduced, the respective points of introduction being vertically so spaced from each other that the acid has a chance and is enabled to react with a column or body of the exchange material after that material has reacted with the brine. In this way the regeneration section of the tower is functionally divided into a salt-regeneration zone and an acid-regeneration zone which latter zone is subjacent to the salt-regeneration zone. This sequence of zones is characteristic of this invention in that it allows the acid to be utilized with unusually high efficiency because it provides for the acid to contact the exchange material primarily after strongly held polyvalent ions, namely the water-hardening ions Ca and Mg (termed the hardeners) have been replaced upon the material with weakly held monovalent ions such as Na. The importance of operating in this manner lies in the fact that the H-ions of the acid exchange much more readily with the weakly held monovalent ions than they do with the strongly held polyvalent ions. That is to say, the inefficiency or difficulty which is inherent in de-sorbing from the exchange material strongly held divalent ions (Ca, Mg) is eliminated by the expenditure of inexpensive salt brine. Thus by operating in accordance with this invention net savings are attainable to the extent that the expenditure of expensive regenerating acid normally required is reduced by the expenditure of inexpensive salt brine.

According to one feature this invention employs a regeneration tower with an upper section to effect regeneration and a lower section for washing, yet with the regeneration section functionally divided into a salt-regeneration zone and an acid-regeneration zone. The acid-regeneration zone is disposed below the salt-regeneration zone and is functionally divided therefrom by a two-way permeable partition which is similar in structure and function to that which functionally divides the washing section from the regeneration section. Indeed, each of these two partitions provides underneath it a mixing zone which is liquid-filled and is free of any bulk of the exchange material.

According to that feature the regeneration tower comprises in downward sequence a first zone for preliminary regeneration largely by salt solution, a second zone for final regeneration by acid of the material, and the washing zone, and has the exchange material descending gravitationally through these zones. Each of these three zones has a separate liquid continuously supplied to it at its bottom, namely wash-water supplied to the washing zone, regenerant acid solution supplied to the second regenerant zone, and regenerant salt solution supplied to the first regenerating zone, all moving countercurrently to the descending although subsided material.

Wash-water rising through the washing zone frees the descending material of whatever residual unspent and spent regenerant acid may adhere to it and eventually carries it back up into the acid regeneration zone whence it came. That is to say, spent wash-water rises from the top of the washing zone into a first mixing zone which is free of bulk exchange material. There the spent wash-water in effect constituting weak regenerant acid solution meets and mixes with strong fresh regenerant acid solution feeding into this mixing zone, the strength of the fresh acid being such that the resulting mixture of weak and strong acids constitutes regenerant acid solution of a strength suited for effecting regeneration.

From this first mixing zone the resulting acid solution or mixture rises into and through the acid-regenerating zone where it regenerates a certain suitable portion of the exchange material by converting it from its Na-ion form to its H-ion form, leaving the balance of the material in its Na-ion form, it being remembered that most of that material has previously been salt-regenerated to its Na-ion form. The regenerant acid solution also picks up unspent salt that has leaked or has migrated into the acid-regenerating zone together with the descending material, and eventually carries it together with what unspent acid it may contain back up into the salt-regenerating zone. This solution also carries re-usable Na-ions which have resulted from the exchange with H-ions. In this way both recovered acid (H-ions) and recovered salt (Na-ions) may be re-utilized. In other words, spent acid regenerant solution as it emerges from the acid regeneration zone carries recovered H-ions along with recovered Na-ions into a second mixing zone where in effect it represents a weak solution of acid and of salt. There it meets and mixes with fresh salt solution of such strength that the resulting mixture attains a concentration suited for regeneration in the topmost or salt-regeneration zone above. Indeed, as this mixture strong in salt and weak in unspent recovered acid rises from the second mixing zone into and through the topmost or salt-regenerating zone it meets exhausted material and by contact therewith converts most of that material to its Na-ion form while the admixed acid is finally utilized to convert some of this exhausted material directly to its H-ion form. Spent mixed regenerant solution resulting from the Na-ion exchange and the H-ion exchange discharges from the top of the salt regeneration zone.

As the net result of countercurrent movement of the exchange material relative to the solutions rising through the regenerating tower there discharges from the bottom of the washing zone an exchange material that is mixedly regenerated with Na-ions and with H-ions in such proportion that it is adapted to produce a treated water of blended water specified characteristics. That is to say, exchange material thus mixedly regenerated is being fed continuously to the water treatment tank to effect softening simultaneously with a reduction in alkalinity and in dissolved solids content. Treated water as well as exhausted exchange material is continuously and separately discharged from the water treatment tank. Control or regulation of the blended-water characteristics can be effected by varying the ratio of Na-ions to H-ions with which the exchange material is mixedly regenerated by its passage through the regeneration tower. This control or adjustment is effected by varying the proportions of acid and of salt being fed to the representative regeneration zones of the tower.

Summarizing, the exhausted material is first subjected to regeneration mainly with salt in terms of freshly supplied and recovered Na-ions, while a small portion of the material regenerates initially with H-ions from the amount of admixed recovered acid. Subsequently, a portion of this pre-regenerated material is converted from its Na-ion form to its H-ion form to produce mixedly regenerated exchange material contained in a suitable proportion of Na-ions to H-ions available for exchange simultaneously in the water treatment zone. Thus there presents itself an important and significant aspect of this invention in that there is avoided any substantial contact directly between the exhausted material and the fresh acid until the material has attained its Na-ion form, that is until the polyvalent Ca- and Mg-ions (the water-hardening ions termed hardeners) have been replaced with the monovalent Na-ions. Therefore, since the H-ions of the acid exchange much more readily with monovalent ions than they do with polyvalent ions, the regeneration operation according to this invention improves the economy by reducing the expenditure of the expensive regenerating acid, for example $H_2SO_4$.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Other features and advantages will appear as this specification proceeds.

Figure 1:
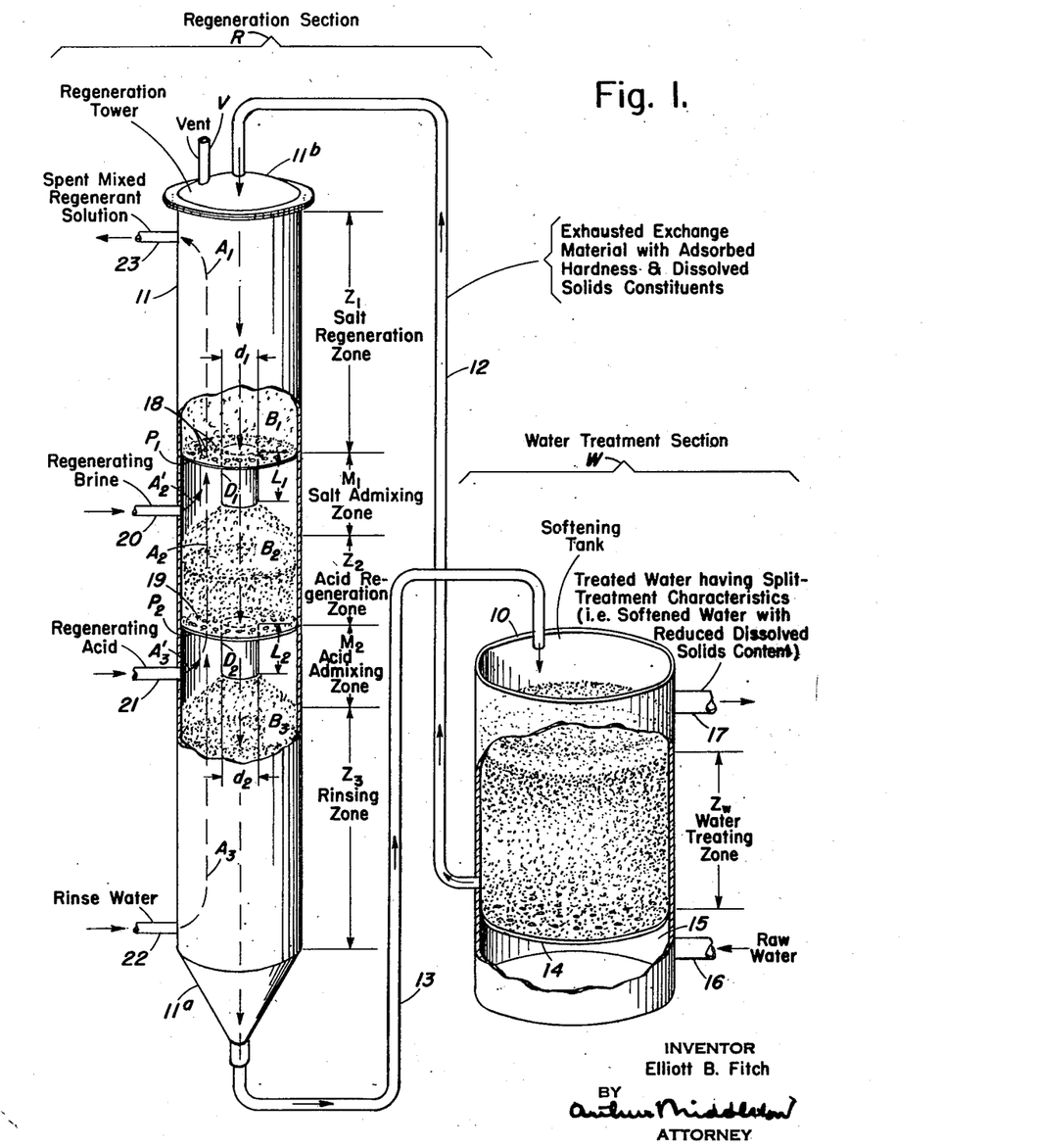
Fig. 1 is a general perspective semi-diagrammatic view of the continuous treatment system.

A general diagrammatic view of the treatment system in Fig. 1 shows the exchange material moving in continuous and repetitive cycles through a regeneration section R and through a water treatment section W, both sections being operatively interconnected in a closed circuit by suitable conduit and transfer means. While exchange material is thus circulating through the system, raw water entering the water treatment section discharges therefrom as treated water in a continuous flow countercurrent to the movement of the exchange material. Meanwhile regenerant solutions entering the regeneration section discharge therefrom as spent solutions in a continuous flow countercurrent to the movement of the exchange material.

The water treatment section W comprises a treatment tank 10 while the regeneration section R comprises a regeneration tower or column 11, both the tank and the tower operating in closed circuit. That is to say, exchange material having been exhausted by the treatment of raw water in tank 10 is transferred from the bottom of the tank to the top of the tower, such transfer being diagrammatically indicated by a conduit 12. As the material gravitates through the tower, namely through a sequence of treatment zones therein, it discharges from the bottom of the tower in a regenerated as well as washed condition, to be re-transferred to the top of the tank 10, such re-transfer being diagrammatically indicated by a conduit 13. While the exchange material thus moves in a circuit through the system, namely downwardly through the tank as well as downwardly through the tower, it moves countercurrently to the upward flow of the water being treated in the tank, as well as countercurrently to certain treatment liquid such as regenerant solutions and rinse water passing upwardly through the tower.

The tank 10 has a liquid permeable partition or false bottom, that is a horizontal perforated partition or so-called constriction plate 14 defining beneath it a feed-distributing chamber 15 supplied by a raw water inlet 16, and above it a water treatment zine $Z_w$ proper from the top end of which treated water discharges through a treated water outlet 17. The upward velocity of the water is such as to prevent "dead" settling of the exchange material by keeping it in a teeter condition while permitting its generally downward progress through the tank and to a point of discharge therefrom just above the constriction plate.

The regeneration tower 11 has a constricted bottom $11^a$ of inverted cone shape and a top $11^b$ provided with a vent V. Exhausted exchange material feeds continuously to the top while regenerated and rinsed exchange material is being continuously withdrawn from the bottom of the tower. The tower is functionally subdivided by an upper and a lower two-way permeable partition $P_1$ and $P_2$ respectively defining operating zones $Z_1$, $Z_2$, $Z_3$ containing respective beds of bodies of subsided even though descending exchange material $B_1$, $B_2$, and $B_3$. The term "two-way permeable" is herein used to indicate that each partition allows for upward one-way passage therethrough of liquid as well as for downward one-way passage therethrough of exchange material. That is to say, one portion of each such partition represents an area herein termed the bed-supporting area which has perforations sufficiently small to support a body or bed of subsided although continuously descending exchange material while admitting upflowing liquid to that body. Another portion of such a partition represents an area herein termed the transfer area through which the exchange material transfers gravitationally from one treatment zone to the next. The transfer area is represented by the effective cross-sectional area of a downwardly extending neck or boot herein termed a downspout of suitable length and diameter which downspout in turn may be considered representative of a plurality of downspouts equally distributed with respect to the cross-sectional area of the tower.

In partition $P_1$ the distributing area has perforations 18, while the transfer area is represented by the cross-sectional passage area of downspout $D_1$ of the length $L_1$ and the diameter $d_1$. In partition $P_2$ the bed-supporting area has perforations 19, while the transfer areea is represented by the cross-sectional passage area of downspout $D_2$ of the length $L_2$ and the diameter $d_2$. Each of the downspouts $D_1$ and $D_2$ may be considered as representative of a plurality of such downspouts provided in the respective partition and equally distributed with respect to the cross-sectional area of the tower.

The length of the downspout $D_1$ defines and provides for a liquid-filled mixing zone $M_1$ underneath the partition $P_1$, that is a mixing zone interposed between bodies $B_1$ and $B_2$ of exchange material, this mixing zone being free of any bulk exchange material and serving for freshly introduced regenerant solution to mix with solution rising through and from the body $B_2$ of material. That is to say, a continuous supply of strong regenerant brine indicated at 20 enters the mixing zone $M_1$ at a controlled rate to mix with other solution rising through the tower. From zone $M_1$ the solution mixture rises through the perforations 18 into and through the body $B_1$ of exchange material above with the length and diameter of downspout $D_1$ as well as the rate of passage of material through this downspout being such as to discourage any substantial upflow as well as any substantial downflow of solution therethrough.

Similarly, the length of downspout $D_2$ defines and provides for a liquid-filled mixing zone $M_2$ underneath partition $P_2$, that is a mixing zone interposed between bodies $B_2$ and $B_3$ of exchange material, this mixing zone being free of any bulk exchange material, and serving for freely introduced regenerant solution to mix with solution rising through the tower. That is to say, a continuous supply of strong regenerating acid indicated at 21 enters the mixing zone $M_2$ at a controlled rate to mix with other solution rising through the tower. From zone $M_2$ the acid solution mixture rises through the perforations 19 into and through the body $B_2$ of exchange material above, with the length and diameter of downspout $D_2$ and the rate of passage of material through this downspout being such as to discourage any substantial upflow or any substantial downflow of solution therethrough.

A continuous supply of rinse water indicated at 22 enters the bottom end portion of the tower and rises through body $B_3$ of exchange material for rinsing the same free of and recovering any residual regenerating acid having passed with the material through downspout $D_2$. The zone $Z_3$ occupied by the body $B_3$ of the descending material is therefore herein termed the rinsing zone, and the upflow therethrough of rinse water is indicated by a dotted-line arrow $A_3$. The spent rinse water entering the mixing zone $M_2$ thus in fact represents a highly dilute regenerant acid solution which in turn mixes with the fresh acid supply 21 (as indicated by dotted-line arrow $A_3'$) to make a regenerant acid solution of a desired intermediate strength to rise through perforations 19 of partition $P_2$ into and through the subjacent treatment zone $Z_2$ which is occupied by body $B_2$ of exchange material and is termed the acid regeneration zone. Regeneration by the acid rising through this zone (as indicated by arrow $A_2$) substitutes H-ions for cations upon the material.

Spent regenerant acid solution containing an unspent portion of the acid from the body $B_2$ of exchange material enters the mixing zone $M_1$ to mix with the supply of fresh regenerating brine 20 (as indicated by arrow $A_2'$), this mixture then containing a predominance of brine (NaCl) including that which may have leaked with the material through downspout $D_1$ and which brine leakage has been picked up and salvaged by the rising solution although with a relatively small proportion of unspent and available generating acid admixed. At any rate and generally speaking the solution mixture rising from the mixing zone $M_2$ through perforations 18 into and through the superjacent treatment zone $Z_1$ (as per dotted-line arrow $A_1$) represents regenerating salt solution of desired strength effective to replace the major portion of the cations, and notably the polyvalent ones, with Na-ions upon the exchange material. The importance of replacing the polyvalent cations upon the material with monovalent Na-ions by way of auxiliary regeneration with salt will be elaborated upon further below. A discharge of spent regenerant solution from the top end of the salt regeneration zone is indicated at 23.

Figure 2:
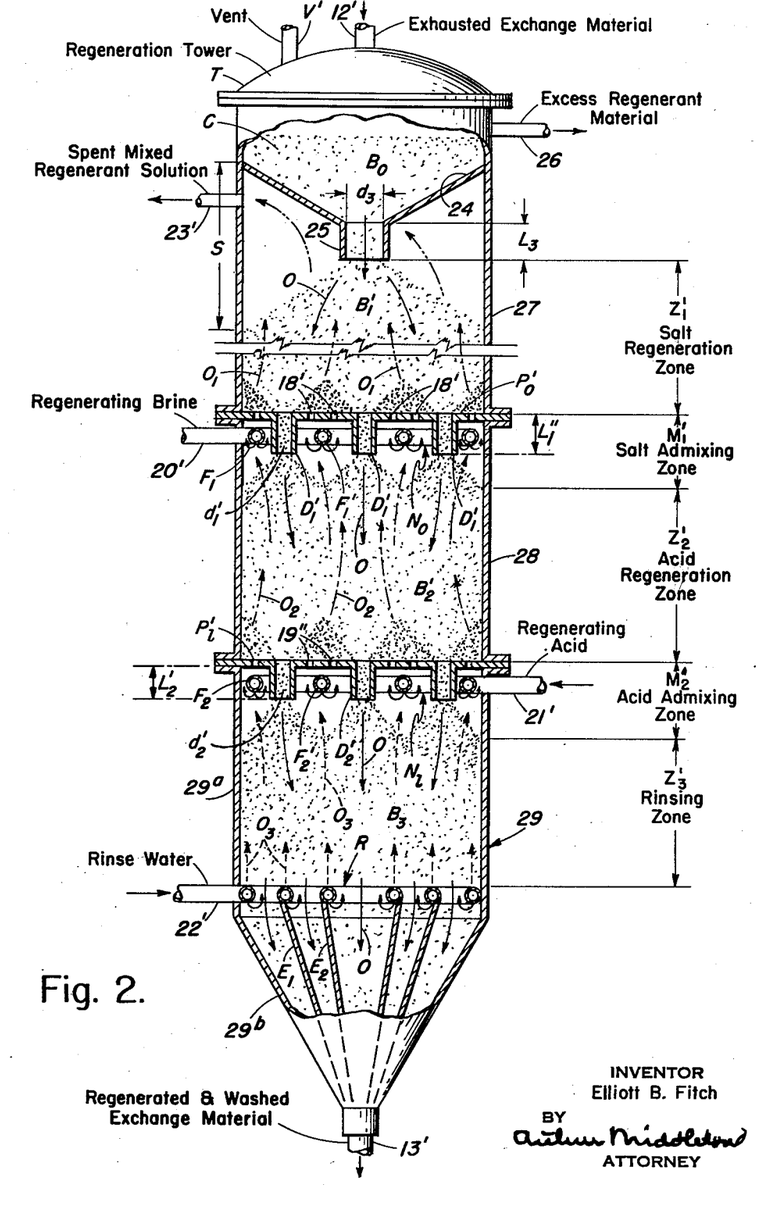
Fig. 2 is a sectional view of the regeneration tower.

Fig. 2 shows the regeneration tower here designated as T more fully implemented especially with respect to the constriction of two-way partitions $P_0'$ and $P_1'$, with respect to feed distributing piping $N_0$ and $N_1$ disposed within respective mixing zones $M_1'$ and $M_2'$ for the respective regenerant solutions with respect to similar feed distributing means for the rinse water, and last but not least with respect to an additional feed-equalizing receiver chamber C for exhausted exchange material to be delivered thereto at a rate in excess of that at which material is being withdrawn from the bottom of the tower. The chamber C is defined by a relatively shallow bottom 24 of inverted cone shape having a discharge boot or neck 25 of the length $L_3$ and the diameter $d_3$, the dimensions of this boot and the rate of passage of material being such as to discourage upflow of liquid therethrough. The continuous supply of exhausted exchange material indicated at 12', along with a suitable proportion of carrier water enters the chamber C at a rate in excess of what passes down through the tower and discharges at 13' from the bottom thereof, but provision is made for an overflow and discharge connection 26 through which any material thus excessively fed may pass off and be returned to the water treatment tank 10 whence it came.

Interposed between these sections 27 and 28 of the tower is the upper partition $P_0'$ shown to have perforations 18' and a plurality of downspouts $D_1'$ of the length $L_1'$ and the diameter $d_1'$. The downspouts $D_1'$ are so arranged as to clear concentric feed tubes $F_1$ and $F_1'$ with their radial interconnections constituting the feed distribution pipe $N_0$.

Similarly, the lower partition $P_1'$ is interposed between sections 28 and 29 of the tower and has the perforations 19" and a plurality of downspouts $D_2'$ of the length $L_2'$ and the diameter $d_2'$. The downspouts $D_2'$ are so arranged as to clear concentric feed tubes $F_2$ and $F_2'$ with their radial interconnections constituting the feed distribution pipe $N_1$. Inverted conical concentric discharge guide baffles $E_1$ and $E_2$ are provided in the inverted conical bottom $29^b$ of the tower.

The movement of the exchange material descending through a sequence of treatment zones $Z_1'$, $Z_2'$, $Z_3'$ of the tower is indicated by full-line arrows O; the upflow of rinse water from the feed distribution piping R through the rinsing zone $Z_3'$ is indicated by dotted-line arrows $O_3$; dot-and-dash line arrows $O_2$ indicate upflow of acid regenerant solution from the feed distribution pipe $N_1$ through acid regeneration zone $Z_2'$; while double dot-and-dash line arrows $O_1$ indicate the upflow of regenerating salt solution from the distribution piping $N_0$ through the salt regeneration zone $Z_1'$.

Figure 3:
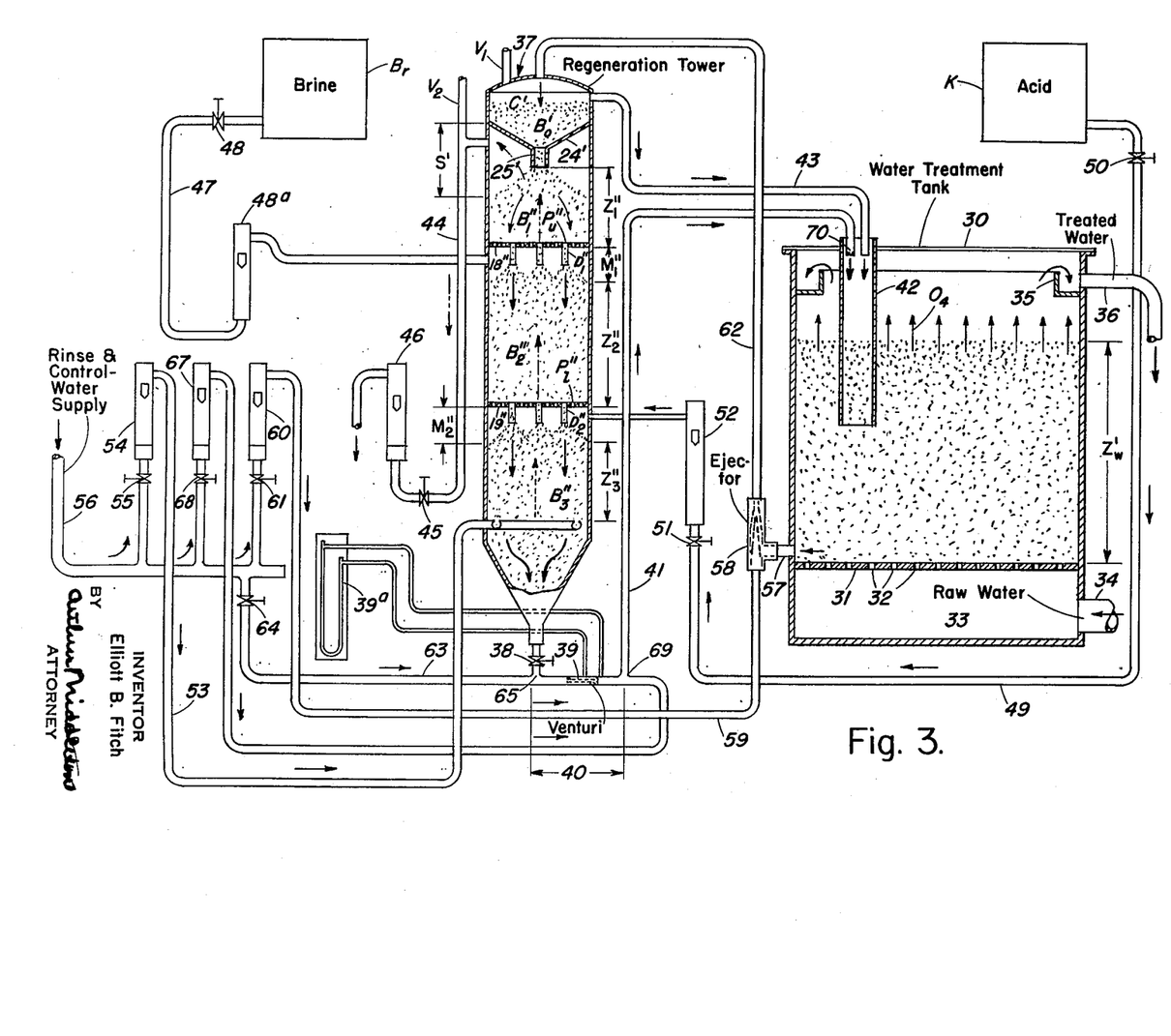
Fig. 3 shows the treatment system more fully implemented for maintaining the cyclic movement of the exchange material therethrough.

The treatment as a whole while diagrammatically presented in Fig. 1 is shown more fully implemented in Fig. 3 especially with respect to transfer and control means effective between the water treatment tank and the regeneration tower for moving the exchange material in closed circuit through the system.

A water treatment tank 30 has a perforated false bottom or constriction plate 31 in which the perforations are indicated at 32 and which plate defines a feed distribution chamber 33 receiving raw water through inlet 34. Above the constriction plate is indicated a water treatment zone $Z_w'$ representing a bed of exchange material kept in teeter condition by the upflowing water, the upflow being indicated by arrows $O_4$. Treated water rising from the teeter bed or water treatment zone $Z_w'$ overflows into a launder 35 and discharges therefrom by way of an outlet 36.

A regeneration tower 37 discharges regenerated and rinsed exchange material along with a proportion of carrier water through a bottom outlet control valve 38, through a Venturi tube 39 provided in an intermediate length of pipe 40 and then through a terminal length of pipe 41 into a feedwell 42 extending a distance $d_3$ into the teeter bed or water treatment zone $Z_w'$ in tank 30. Also into this feedwell leads an overflow discharge pipe 43 carrying excessively fed regenerated exchange material together with carrier water from the top of tower 37 back into the water treatment zone of tank 30.

The regeneration tower 37 resembles that of Fig. 2 in that it has a feed-receiving chamber C' at the top defined by an inverted cone-shaped although relatively shallow bottom or partition 42' having a central discharge neck or boot 25'. The tower has an upper two-way partition $P_u''$ having perforations 18" and downspouts $D_1''$ resembling the perforations and downspouts of partition $P_u'$ of Fig. 2. The tower also has a lower two-way partition $P_1''$ with perforations 19" and downspouts $D_2''$ resembling the perforations and partitions of $P_2'$ of Fig. 2. While the exchange material is descending through the tower at the rate at which it is being withdrawn from the bottom thereof, there can be discerned a supply body of exchange material $B_0'$ in chamber C', a first body of exchange material $B_1''$ above the upper partition $P_u''$, a second body of exchange material $B_2''$ occupying an acid-regeneration zone above the lower partition $P_1''$, and a third body of exchange material $B_3''$ upon the bottom of the tower and occupying a rinsing zone $Z_3''$. While the body $B_0'$ represents merely a quantity kept constant of supply of exhausted exchange material, the bodies $B_1''$, $B_2''$, $B_3''$ represent quantities of the material in successive stages or zones of regeneration treatment. There is a liquid-filled zone S' between the body $B_1''$ and the partition 24' from which zone spent regenerant solution discharges through a vented pipe 44 by way of a control valve 45 and a flow meter 46, a vent being indicated at $V_2$. There is a liquid-filled upper mixing zone $M_1''$ between the body $B_2''$ and partition $P_u''$ into which feeds strong regenerating brine from a brine supply tank $B_r$ through a brine supply pipe 47 and a control valve 48, and by way of a flow meter $48^a$. A liquid-filled lower mixing zone $M_2''$ is represented by the space between body $B_3''$ and the partition $P_1''$, into which zone feeds strong regenerating acid from an acid supply tank K through an acid supply pipe 49 provided with control valves 50 and 51 as well as with a flow meter 52.

Rinse water is supplied to the bottom end portion of the tower and into the rinsing zone $Z_3''$ through a rinse water supply pipe 53 provided with a flow meter 54 and with a control valve 55, which supply pipe constitutes a branch conduit leading from a pressure water supply header 56.

Exhausted exchange material is being withdrawn from the lower portion of the water treatment zone $Z_w'$ or teeter bed in tank 30 at a point just above the constriction plate 31 through an outlet neck 57. This outlet neck leads into an ejector 58 operated by pressure water supplied through a pipe 59 provided with a flow meter 60 and a control valve 51, which pipe leads from the water supply header 56. The ejector thus lifts exhausted material suspended in a suitable quantity of carrier water up through a riser pipe 62 leading to the receiver chamber C' of the tower. The rate of transfer of exhausted material to the tower is so controlled as to supply to the tower a quantity of material in excess of the amount of regenerated material that is being withdrawn from the bottom of the tower, the excess material being allowed to overflow from the chamber C' through pipe 43 back into the water treatment tank 30.

The rate of withdrawal of regenerated material from the bottom of tower 37 and the transfer of that material to the water treatment tank 30 are controlled by the seating of the valve 38 as well as by the operation of the Venturi flow meter 39 through which the material must pass on its way to tank 30. The rate of transfer is regulated by admitting controlled amounts of pressure water, herein termed the primary control water, into the transfer conduit at a point between the Venturi meter and control valve 38, and further admitting a controlled amount of pressure water, herein termed the secondary control water, into the transfer conduit 41 at a point past the Venturi meter. That is to say, a pipe 36 leading from the supply header 56 and provided with a control valve 46 joins the intermediate pipe length 40 at 65 thus carrying primary control water under controlled pressure to the inlet end of the Venturi meter, and this pipe 63 is herein termed the primary control water pipe. Another pipe 66, herein termed the secondary control water pipe, also leading from the supply header 56 and provided with a flow meter 67 and with a control valve 68, joining pipe 41 at 69, carries secondary control water to the outlet end of Venturi meter 39. The Venturi meter 39 is provided with a flow-rate indicator 39ª the familiar function of which is based upon the well-known Venturi pressure differential, here designated as $\Delta p$.

The rate of migration of the exchange material descending through the tower 37 depends upon the rate at which it is being allowed to discharge as a slurry from the bottom end of the tower. While the conditions are for gravity transfer of slurry of exchange material from the tower to the tank (the tower being higher than the tank), an accurate control of the rate of discharge of the slurry of exchange material is effected hydraulically, namely by adjusting the pressure of the primary and of the secondary control water in pipes 63 and 66 respectively. In other words, an adjustment of the discharge rate can be effected by setting the control valves 64 and 68 to regulate the pressures and rate of supply of the primary and the secondary control water respectively with the aid of indications by respective flow metering devices 39ª and 67. Indeed, such discharge control can be effected by maintaining the discharge valve 38 and the control valve 64 each at a setting found suitable, while the valve 68 controlling the supply of the secondary control water represents the variable to be adjusted for either increasing or decreasing the pressure and flow rate of the secondary control water in pipe 66. By such adjustment more or less back pressure can be exerted upon the slurry of exchange material discharging from tower 37. That is, an increase in the supply of secondary control water will correspondingly retard the descent of exchange material through the tower, whereas a decrease of that supply will accelerate the descent. A proportional controlling effect of the secondary control water in fact is due to the presence of an effluent-restraining or effluent-choking discharge orifice 70 provided at the discharge end of transfer pipe 41. The size of the discharge orifice is such that it will permit the discharge of the allowable maximum volume of slurry of exchange material into the softening tank, namely a volume corresponding to the maximum throughput of material provided for. Therefore, in one extreme instance the allowable maximum quantity of exchange material would actually discharge through orifice 70 into tank 30, if the supply of secondary control water through pipe 66 were shut off entirely. In that instance only primary control water would be utilized as a diluent to furnish carrier water for the dense slurry of exchange material discharging from the tower, and that water would represent the carrier medium that transfers the material to the water treatment tank 30. By introducing or forcing secondary control water into the slurry transfer pipe 41 at the junction 68, the quantity of exchange material actually transferred will be reduced.

The rate at which slurry of exchange material is transferred from the water treatment tank 30 to the top of tower 37 is controlled by throttling the pressure water supplied by pipe 59 to the ejector 58 according to indications of flow meter 60.

The operation of the tower 37 involves the descent therethrough of the exchange material and the movement countercurrently thereto of the rinse water which in the course of its upflow through the tower (successively) first mixes with the regenerating acid and then with the regenerating brine. The rate of descent of the material is coordinated to the upflow rate of liquid through the tower and indeed to the individual rates of feed of the rinse water, of the acid, and of the brine respectively, all as regulated by their respective control valves. In turn, the proportions of acid and of brine fed to their respective treatment zones in the tower are adjusted by their control valves with respect to each other and in accordance with the requirements of mixed regeneration initially defined to the end of attaining the treated water characteristics above set forth.

The rinse water under suitable pressure enters the bottom portion of the rinsing zone $Z_3''$ so that a part of that water discharges from the bottom of the tower in the discharging slurry of exchange material, while the major portion of the rinse water flows upwardly through the rinsing zone. Spent rinse water entering the mixing zone $M_2''$ mixes with fresh strong acid introduced at this point, the mixture constituting fresh acid regenerant solution. This mixture because of the pressure of the rinse water is forced upwardly through the perforations 19'' of partition $P_1''$ and through the superjacent acid regeneration zone $Z_2''$. Spent acid regenerant solution from that zone enters the mixing zone $M_1''$ to mix with fresh strong brine being introduced into the tower at that point to constitute fresh salt regenerating solution being forced upwardly through the perforations 18'' of partition $P_u''$ into and through the salt regeneration zone $Z_1''$. Spent mixed regenerant entering the liquid-filled zone S' discharges through pipe 44 by way of the control valve 45 and the flow meter 46.

The upflow rate of the rinse water through the exchange material in the rinsing zone is to be great enough so that the residual acid is displaced or washed therefrom before the material reaches the bottom of the rinsing zone. Nevertheless the rinse water volume should not be in excess of that desired for mixing with the strong acid for obtaining an acid regenerant solution not unduly diluted. Therefore, the rate of descent of the exchange material in the tower is to be correlated to the upflow of the rinse water.

The choice of a suitable upflow rate for the rinse water is further governed by the fact that a heavy solution (strong acid) is introduced into a lighter liquid (spent rinse water) in such a manner that a zone of the heavier liquid is maintained above the zone of the lighter liquid. However, the provision of the liquid-filled mixing zone $M_u''$ together with the effect of innumerable small streams of spent rinse water rising from voids of the exchange material into the mixing zone discourage any tendency of strong acid to "plunge" into and through the rinse water of the rinsing zone and thus to leak with the slurry from the discharge end of the tower. Indeed, the effect of the top face of the bed of exchange material might be compared to the effect of a constriction plate where the interstices in the top layer of granules of the material correspond to the perforations in such a plate. That is to say, an upward flow of rinse water through such a multitude of perforations prevents any downflow from occurring at the same time. In this way, the flow velocity of the many small upward rinse water streams have downward flow and sustain the heavier liquid on top even at what may be called a practical minimum expenditure of rinse water. Tendency of downward leakage of regenerant acid is furthermore discouraged by the provision of the conical outlet baffles $E_1$ and $E_2$ (see Fig. 2) which prevent descending exchange material from short-circuiting towards the bottom outlet of the tower. The effect of the upper mixing zone $M_u''$ is similar to that of the lower mixing zone $M_1''$ with respect to any tendency of downward "plunging" of strong brine.

The downspouts $D_1''$ and $D_2''$ in the respective partitions $P_u''$ and $P_1''$ are distributed uniformly over the cross-sectional area of the tower so that the rate of descent of the material is substantially uniform throughout that area. The spacing of the downspouts from one another is such that only a reasonably small stagnating volume of exchange material remains between them on top of each of the partitions. The number of downspouts and their diameter are chosen large enough to avoid their being plugged up by the exchange material yet not so large as to interfere with the establishment of certain flow and operating conditions in the tower such as will be presently explained. While a loss of hydraulic head is being incurred by the liquid flowing upwardly through the perforations in each of the partitions $P_u''$ and $P_1''$, it is desired that the liquid pass through the perforations rather than through the downspouts which have a diameter many times that of the small holes. The granules of exchange material descending through the downspouts have regenerant solutions entrained between them so that their downward migration tends to transport or draw entrained regenerant solution downwardly through these spouts, for example, from the acid regeneration zone into the rinsing zone. In order that such downward transfer of solution be minimized, the length of the downspouts is so chosen that the hydraulic head equivalent to this downward drawing or pumping effect is substantially equal to and offset by the loss in head across the partition, that is the loss encountered by the liquid passing upwardly through the partition. Thus an approximate hydraulic balance is established across the downspouts, that is hydraulic balance as between a level at the upper end and a level at the lower end of these spouts.

When excess exchange material or slurry returns by overflow from the chamber or reservoir $C'$ to the water treatment tank 30, care is to be taken that carrier water in this slurry be not contaminated by regenerant solution spent or unspent leaking upwardly through the neck 25' from the brine regeneration zone. A differential hydraulic head is maintained by adjusting the rate of flow through effluent pipe 44 so that there will result a small net downflow of water from the body $B_0'$ of material in chamber $C'$ into the liquid-filled zone $S'$ below and thence into the discharge pipe 44.

Since the exchange material having subsided in chamber $C'$ reaches the subjacent regeneration zone through a constriction as represented by the neck $25_1'$ a suitable downward velocity of the descending material and entrained water is established therein which discourages or bars the upward percolation of solution from the salt-regeneration zone into chamber $C'$. Yet this constriction represents resistance against excessive transfer of water from chamber $C''$ into the regeneration zone below. Thus the operation may be conducted with a positive head for downward percolation of water through the neck $25_1'$ yet without losing into the spent mixed regenerant solution any substantial amount of carrier water needed for lifting the exchange material from tank 30 to the top of tower 37.

The exhausted granular exchange material supplied by carrier water to the top of the tower is allowed to subside in chamber $C'$ into a body $B_0'$, the subsided material in effect being supported through neck $25'$ by the subjacent body $B_1''$ of subsided exchange material in the regeneration zone. The body $B_1''$ in turn is similarly supported through material in the downspouts $D_1''$ by the body $B_2''$ of subsided material in the acid-regeneration zone, which latter subsided material in turn is supported through downspout $D_2''$ by the subsided material of body $B_3''$ in the subjacent rinsing zone which latter subsided material in turn is supported through downspouts $D_2''$ by the subsided material of body $B_3''$ in the subjacent rinsing zone which latter material in turn is supported by the bottom of the tower. That is to say, there is a continuity of exchange material in subsided condition from top to the bottom portion of the tower through the various zones, although submerged in the respective liquids rising through these zones. In such continuity and submergence the material will descend through the tower from one zone to the next at the controlled rate at which regenerated and rinsed material is being discharged from the bottom of the tower.

While the physical operation and the hydraulic operating conditions of the treatment system will be understood from the description of the Fig. 3 implementation and embodiment, the operation from a chemical and ion-exchange standpoint may be described by reference to the simplified and semi-diagrammatic Fig. 1 presentation of the system, as follows:

Mixedly regenerated exchange material feeds through conduit 13 into the treatment tank 10 at the controlled rate at which it discharges from the regeneration tower 11, the material having available in it desired proportions of Na-ions and of H-ions. The dimensions of tank 10 are such that the effective water treatment zone $Z_w$ is maintained in the form of a teeter bed by the rate of upflow therethrough of water entering the bottom of the bed through inlet 16 as raw water and discharging as treated water through outlet 17 from above the teeter bed proper. In other words the tank dimensions are such that the flow volume of water needed for maintaining the teeter bed is also that volume which the descending exchange material will treat adequately to give it the desired split treatment characteristics along with an adequate exhaustion and utilization of the exchange material.

Because the exchange material is partly in its sodium form and partly in hydrogen form the solutes in the water in tank 10 react with the exchange material in such a manner that one portion of the hardness-imparting cations—the so-called hardeners (Ca, Mg)—exchange for the Na-ions available upon the material. Another portion of the hardeners and/or other cations exchange for H-ions also available upon the exchange material. The net result of this mixed exchange is a treated water not only generally softened (freed of Ca and Mg-ions) but also with its total alkalinity reduced to a specified degree.

For delivery to the treatment tank 10 of exchange material that is mixedly regenerated, namely partly in its sodium form and partly in its hydrogen form so as to have available desired proportions of exchangeable Na-ions and H-ions, the operation of the regeneration tower is as follows:

Exchange material which is substantially exhausted by the hardness-constituting cations (Ca, Mg) as well as by other cations feeds from tank 10 through conduit 12 to the top of tower 11 to subside into the salt-regeneration zone $Z_1$. The regenerating solution rising from the mixing zone $M_1$ into the body $B_1$ of exchange material in zone $Z_1$ contains sufficient Na-ions in the form of brine to enable it to render substantially all of the material descending through that zone into its sodium form by imparting to the material the molar equivalent of Na-ions in exchange for the hardeners, with a small proportion of unspent regenerant acid present in the brine solution to compete with the Na-ions in rendering some of the material into its hydrogen form. The term "competing" is here used in view of the fact that the Na-ions are generally adsorbed somewhat preferentially as compared with the adsorption of the H-ions. However, the brine content or quantity of available Na-ions can be so controlled as to allow the unspent acid to be largely utilized so that all in all very little excess regenerating acid is required over the H-ion requirement for producing split-treatment characteristics in the treated water.

Generally speaking, however, the exchange material that descends through the downspouts $D_1$ into the acid-regeneration zone $Z_2$ is in its sodium form offering monovalent Na-ions (instead of bivalent hardeners) for exchange with H-ions of the acid-regenerant solution that rises from the mixing zone $M_1$ through perforations 19 and through bed $B_2$. The H-ions of the acid readily and efficiently exchange with a corresponding portion of the Na-ions during the descent of the material through this zone where the acid need not compete with brine while rendering a portion of the material into its hydrogen form. In this way the exchange material descending through the downspouts $D_2$ will have become mixedly regenerated in certain desired proportions with Na-ions and H-ions respectively.

The mixedly regenerated material then descends through the rinsing zone $Z_3$ along with some entrapped unspent acid to have that acid washed upwardly and back into the mixing zone $M_2$ for making up fresh regenerant solution.

I claim:

1. The method of mixedly regenerating exhausted ion exchange material with H-ions and with Na-ions which comprises gravitationally passing the material continuously downwardly through a sequence of three liquid-filled intercommunicating treatment zones with the rate of descent of the material being such as to have present in each zone a body of said material subsided and submerged, said zones comprising in downward sequence an Na-ion regeneration zone in which the material is regenerable with salt solution, an H-ion regeneration zone in which the material is regenerable with acid regenerant solution, and a washing zone in which the material is washed free of residual regenerant chemical; continuously passing rinse water upflow through the washing zone and countercurrently to the descending material so that spent rinse water passes from the body of material in the washing zone carrying highly diluted residual regenerant acid washed from the material; continuously supplying fresh acid regenerant solution of a high concentration to the spent rinse water to constitute acid regenerant solution mixture of intermediate concentration to pass upwardly into and through the material of the acid regeneration zone for partly converting converting Na-ion regenerated material in that zone to its H-ion form so that substantially spent acid regenerant solution passes from that material; continuously supplying salt regenerant solution to the spent acid regenerant solution to constitute predominantly salt regenerant solution having an admixture of unspent acid to pass upwardly into and through the body of material of the salt regeneration zone for regenerating that material mainly with Na-ions so that spent regenerant solution passes continuously upwardly from the material in that zone while mixedly regenerated and washed material discharges downwardly from the washing zone.

2. The method according to claim 1, with the addition of passing the washed exchange material through a water-treating zone in a manner to estabilsh a teeter condition of the material, while discharging substantially exhausted material at some point in said zone and treated water at the top of said zone.

3. The method of continuously regenerating exhausted H-ion exchange material substantially to its acid form which comprises gravitationally passing the material continuously downwardly through a sequence of three liquid-filled treatment zones with the rate of descent of the material being such as to have present in each zone a body of said material subsided and submerged, said zones comprising in downward sequence an Na-ion regeneration zone in which the material is regenerable with salt solution, an H-ion regeneration zone in which the material is regenerable with acid regenerant solution, and a washing zone in which the material is washed free of residual regenerant chemical; continuously passing rinse water upflow through the washing zone and countercurrently to the descending material so that spent rinse water passes from the body of material in the washing zone carrying highly diluted residual regenerant acid washed from the material; continuously supplying fresh acid regenerant solution of a high concentration to the spent rinse water to constitute acid regenerant solution mixture of intermediate concentration to pass upwardly into and through the body of material of the acid regeneration zone for converting Na-ion regenerated material in that zone to its H-ion form so that substantially spent acid regenerant solution with an admixture of unspent acid passes from that material; continuously supplying salt regenerant solution to the spent acid regenerant solution to constitute predominantly salt regenerant solution having an admixture of unspent acid to pass upwardly into and through the body of material of the salt regeneration zone for regenerating that material mainly with Na-ions and to a minor degree with H-ions so that spent regenerant solution passes continuously upwardly from the material in that zone while the regenerated and washed material discharges downwardly from the washing zone.

4. The method according to claim 3, with the addition of passing the washed exchange material through a water-treating zone in a manner to establish a teeter condition of the exchange material, while discharging substantially exhausted material from some point in said zone, and treated water at the top of said zone.

5. Apparatus for continuously regenerating exhausted ion exchange material capable of operating in the H-ion cycle, comprising a vertical regeneration tank having inlet means for exhausted material at the top and outlet means for regenerated and washed material at the bottom; a lower two-way transverse partition defining a washing zone below and a regeneration zone above, an upper two-way transverse partition dividing said regeneration zone into an acid regeneration zone below and a salt regeneration zone above, each said partition having at its underside downspouts for downward passage therethrough of the exchange material and also having perforations for upward passage therethrough of liquid, each partition being adapted to support a bed of subsided although descending exchange material, each partition with its downspouts also defining between it and the subjacent zone of exchange material a liquid-filled zone substantially free of bulk exchange material; a first inlet connection for controllably feeding wash water to the bottom of the washing zone for upflow therethrough, a second inlet connection for controllably feeding regenerant acid to the bottom of the acid regeneration zone for upflow therethrough, a third inlet connection for controllably feeding regenerant salt to the bottom of the salt regeneration zone for upflow therethrough, liquid discharge means at the top of the salt regeneration zone, and hydraulically controlled means for discharging regenerated and washed exchange material from the bottom of the washing zone while discouraging discharge of liquid.

6. Apparatus according to claim 5, with the addition of a water treatment tank, inlet means at the bottom of the tank for introducing water to be treated, overflow means for passing treated water from the tank, transfer means for passing washed exchange material from the regeneration tank to the top of the treatment tank, and retransfer means for passing exhausted exchange material from the treatment tank to the top of the regeneration tank.

ELLIOTT B. FITCH.

REFERENCES CITED

The following references are of record in the file of this patent:

UNITED STATES PATENTS

| Number | Name | Date |
| --- | --- | --- |
| 1,740,199 | Nordell | Dec. 17, 1929 |
| 1,770,580 | Neumann | July 15, 1930 |
| 1,942,808 | Dotterweich | Jan. 9, 1934 |
| 2,365,221 | Shafor | Dec. 19, 1944 |
| 2,413,784 | Rawlings et al. | Jan. 7, 1947 |